(12) United States Patent
Chan

(10) Patent No.: US 7,621,990 B2
(45) Date of Patent: Nov. 24, 2009

(54) FILTER DEVICE

(76) Inventor: Yau Nin Chan, 22/F No. 1, Belcher's Street, Kennedy Town (HK)

( * ) Notice: Subject to any disclaimer, the term of this patent is extended or adjusted under 35 U.S.C. 154(b) by 393 days.

(21) Appl. No.: 11/049,343

(22) Filed: Jan. 31, 2005

(65) Prior Publication Data

US 2006/0169145 A1      Aug. 3, 2006

(51) Int. Cl.
*B01D 47/00* (2006.01)
(52) U.S. Cl. .............. 96/227; 96/283; 96/361; 261/92; 95/92; 95/218
(58) Field of Classification Search .............. 96/227, 96/282–283, 269, 332, 361, 134; 261/92; 95/218, 226, 92
See application file for complete search history.

(56) References Cited

U.S. PATENT DOCUMENTS

| | | | | |
|---|---|---|---|---|
| 1,409,592 A | * | 3/1922 | Schram | 261/92 |
| 1,846,057 A | * | 2/1932 | Ilg | 96/287 |
| 2,031,027 A | * | 2/1936 | Barnie | 96/283 |
| 2,058,785 A | * | 10/1936 | Bennett et al. | 210/219 |
| 2,175,779 A | * | 10/1939 | Mohrdieck | 261/24 |
| 2,339,982 A | * | 1/1944 | Dalton | 96/283 |
| 3,747,904 A | * | 7/1973 | Gross | 261/92 |
| 5,205,846 A | * | 4/1993 | Fabrizi | 96/121 |
| 6,017,020 A | * | 1/2000 | Baughman et al. | 261/36.1 |

* cited by examiner

*Primary Examiner*—Duane Smith
*Assistant Examiner*—Ives Wu
(74) *Attorney, Agent, or Firm*—Raymond Y. Chan; David and Raymond Patent Firm

(57) ABSTRACT

A filter device for purifying air includes a filtering tank and a mixing rotor. The a filtering tank has a filter chamber for containing a predetermined volume of filtering solution to filter particles of the air and defining an upper air portion and a lower solution portion, an air inlet formed at the air portion for guiding the air to flow into the filter chamber and an air outlet. The mixing rotor is rotatably supported in the filtering tank, wherein the mixing rotor includes a rotor hub driven to be rotated within the filter chamber, and a plurality of air paddles radially extended from the rotor hub for striking towards the filtering solution at the solution portion of the filter chamber from the at the air portion thereof so as to substantially mix the air from the air inlet with the filtering solution.

18 Claims, 6 Drawing Sheets

FILTER DEVICE

BACKGROUND OF THE PRESENT INVENTION

1. Field of Invention

The present invention relates to an air filter, and more particularly to a filter device which is adapted to block pollutant from polluted air coming from a wide variety of sources, such as from a combustion engine of a transportation vehicle, or from cooking.

2. Description of Related Arts

Air filters have been utilized in a wide variety of areas. The main purpose is to block undesirable pollutants from a mixture of air and those pollutants so that users in the environment in which the filters are used are able to breath with reasonably clean and safe air. As a matter of conventional art, most air filters present some sorts of discrepancies. Some may have the problem of unsatisfactory performance, while others may have the problem of inconvenient application.

As an illustration, polluted air coming out from combustion engine may be considered. Since the invention of combustion engine, an associated phenomenon of air pollution has become one of the most pressing problems around the world. In the past, when the vast majority of people were too poor to own a private vehicle, air pollution was generally tolerable. Nowadays, private vehicles have become necessity for everybody. The development of society is such that virtually everyone can afford to secure some sorts of vehicles (whether they be luxury class, economy class or second hand) for his/her own use. The pollution problem will become intolerable if the nation wants to maintain sustainable development of society.

As a matter of fact, there exist handfuls of techniques which aim to reduce air pollution problem in associated with combustion engines. For example, sulphur content of fuels has generally been reduced to the level which does not produce significant pollution problem. Moreover, most combustion engines have been redesigned in their geometric structures to mitigate the problem of incomplete combustion for minimizing pollutant formation.

However, increasing use of vehicles in recent years means that the reduction of pollutant in individual combustion engines is always compensated by the increase in combustion engine utilization, even to the extent that the various measures taken to combat air pollution have virtually no effect at all. Therefore, further development to reduce air pollution is inevitably required.

As a matter of fact, apart from targeting on fuels and performance of combustion engines, some sorts of filtering devices have been developed and installed to exhaust pipes of vehicles for filtering air pollutant before the combustion air is ultimately discharged into the atmosphere. Although achieving some success, those filtering devices have a significant drawback of affecting the overall performance of the vehicles in question.

A conventional air filter usually comprises at least one, usually two to four, filtering layer forming a plurality of meshes or grips for blocking pollutant from the air passing through the air filter. In such circumstances, air particles are allowed to pass though the filtering layer while larger particles are trapped or stopped by the meshes or grids. As a result, the air passing through the air filter is filtered and should be free of unwanted particles. In practice however, conventional air filter has a significant limitation that where the particles are smaller than the meshes or the grids, they can still pass through the air filter and remain in the air. Very often, carbon particles as well as respiratory particulates are so small that conventional meshes or grids simply allow them to go without filtering.

Of course, one way of resolving this problem is to increase the density of the meshes or grids on the filtering layers such that smaller particles can be blocked as well. Though technically possible, this kind of air filters is usually manufactured by sophisticated technology so that their ultimate selling price is totally unsuitable or unrealistic for widespread applications.

Coming back to domestic environment, the problem enshrined in, for example, domestic range hood is that contaminated air is usually discharged to atmosphere without significant filtering. This causes significant pollution problem for neighborhood. At the same time however, it is difficult to block oil contaminant by incorporating some sorts of oil filters in a conventional range hood.

SUMMARY OF THE PRESENT INVENTION

A main object of the present invention is to provide a filter device which is adapted to block pollutant from exhaust air in a wide variety of situations, such as that coming from a combustion engine of a transportation vehicle.

Another object of the present invention is to provide a filter device comprising a filtering tank containing a predetermined volume of filtering solution, such as water, for cooling and trapping pollutants from the exhaust air so as to substantially filter the exhaust air before emitting into atmosphere.

Another object of the present invention is to provide a filter device which is adapted to use in a wide variety of environments, such as a motor vehicle comprising a combustion engine, or in a domestic or health care environment in which air needed to be effectively filtered, and possibly sanitized.

Another object of the present invention is to provide a filter device which does not involve complicated mechanical and chemical mechanisms for extracting pollutant from polluted or exhausted air, so as to minimize the manufacturing cost and the ultimate selling price of the present invention.

Accordingly, in order to accomplish the above objects, the present invention provides a filter device for purifying air, comprising:

a filtering tank having a filter chamber for containing a predetermined volume of filtering solution to filter particles of the air and defining an upper air portion and a lower solution portion, an air inlet formed at the air portion for guiding the air to flow into the filter chamber and an air outlet for the air to exit from the filter chamber after the air passes through the filtering solution; and a mixing rotor rotatably supported in the filtering tank, wherein the mixing rotor comprises a rotor hub driven to be rotated within the filter chamber and a plurality of air paddles radially extended from the rotor hub for striking towards the filtering solution at the solution portion of the filter chamber from the at the air portion thereof so as to substantially mix the air from the air inlet with the filtering solution.

These and other objectives, features, and advantages of the present invention will become apparent from the following detailed description, the accompanying drawings, and the appended claims.

DETAILED DESCRIPTION OF THE PREFERRED EMBODIMENT

Figure 1:
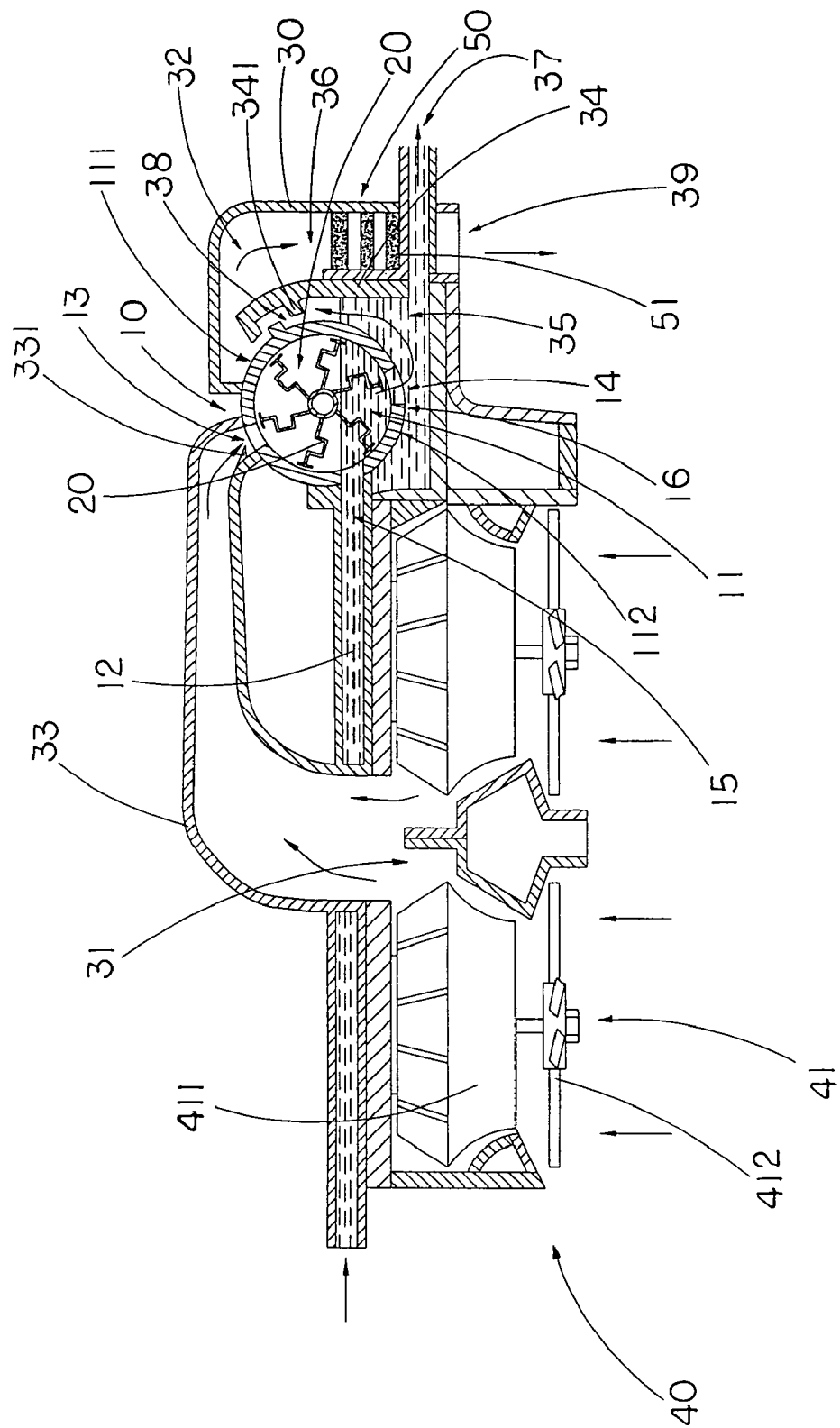
FIG. 1 is a sectional side view of a filter device according to a preferred embodiment of the present invention.
Figure 2:
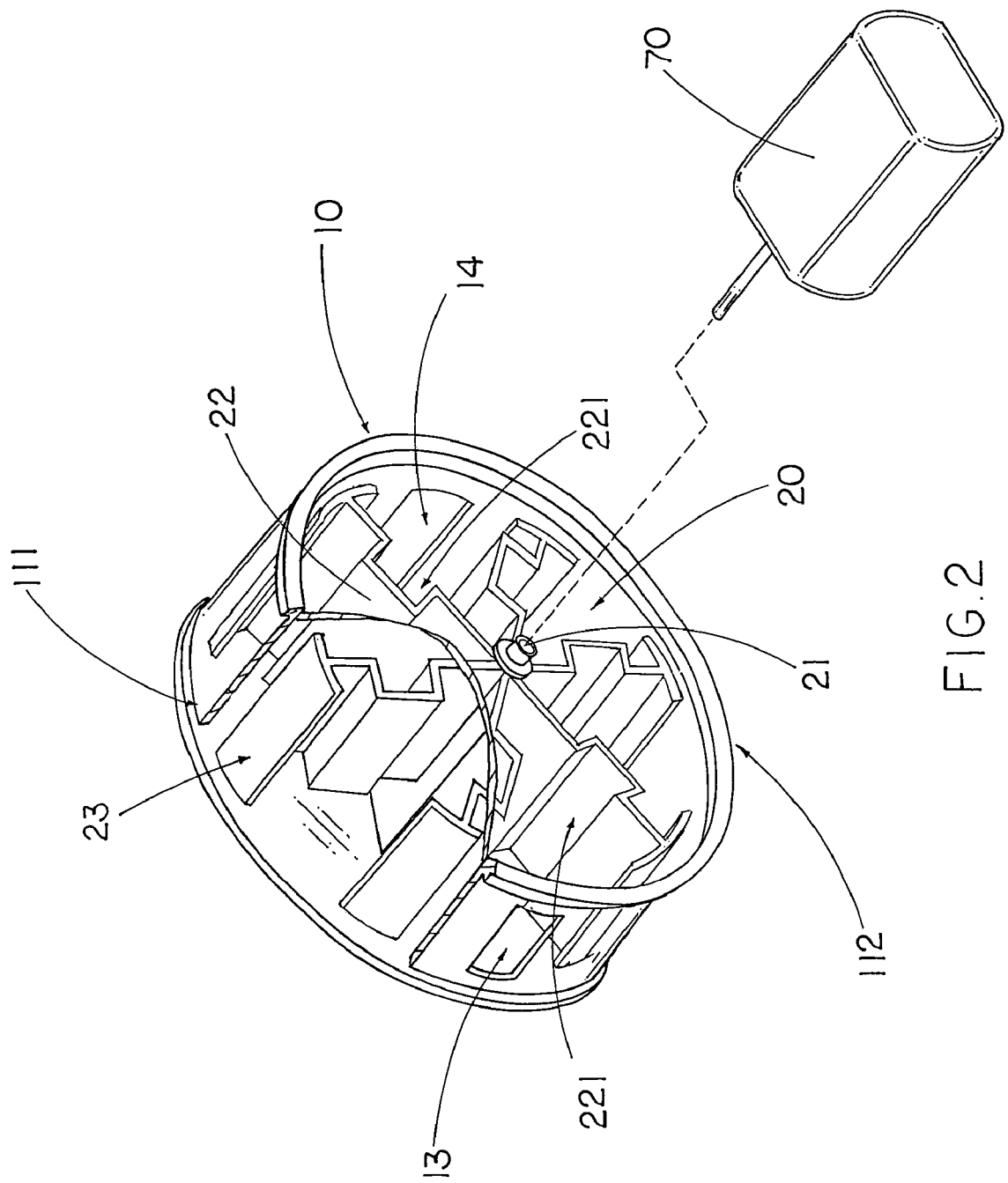
FIG. 2 is a perspective view of the mixing rotor according to the above preferred embodiment of the present invention.
Figure 3:
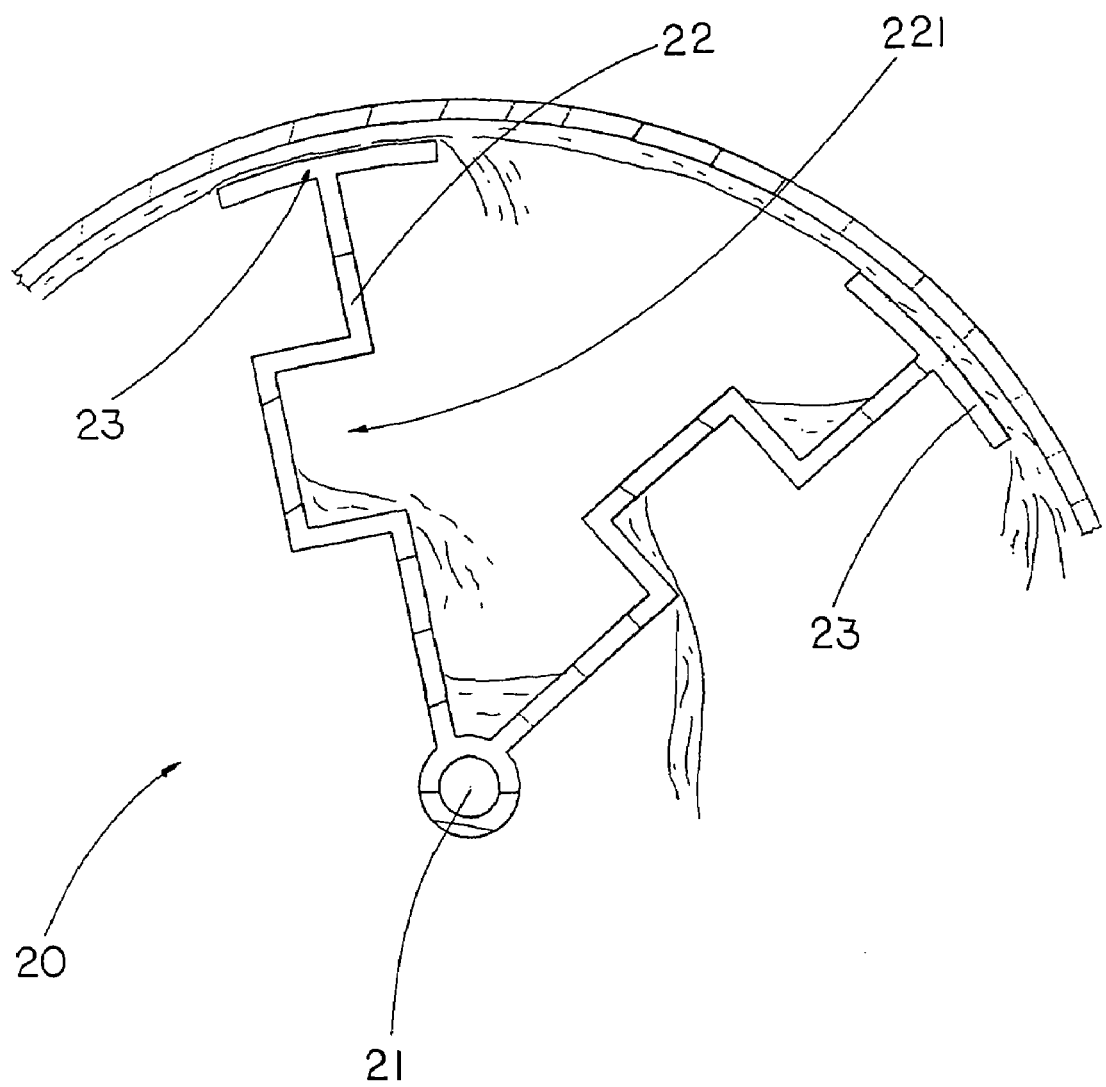
FIG. 3 is a section side view of the mixing rotor according to the above preferred embodiment of the present invention.

Referring to FIG. 1 to FIG. 3 of the drawings, a filter device for purifying air according to a preferred embodiment of the present invention is illustrated, in which the filter device comprises a filtering tank 10 and a mixing rotor 20.

The filtering tank 10 has a filter chamber 11 for containing a predetermined volume of filtering solution 12 to filter particles of the air, and defining an upper air portion 111 and a lower solution portion 112, an air inlet 13 formed at the air portion 111 for guiding the air to flow into the filter chamber 11 and an air outlet 14 for the air to exit from the filter chamber 11 after the air passes through the filtering solution 12.

The mixing rotor 20 is rotatably supported in the filtering tank 10, wherein the mixing rotor 20 comprises a rotor hub 21 driven to be rotated within the filter chamber 11, and a plurality of air paddles 22 radially extended from the rotor hub 21 for striking towards the filtering solution 12 at the solution portion 112 of the filter chamber 11 from the air portion 111 thereof so as to substantially mix the air from the air inlet 13 with the filtering solution 12.

According to the preferred embodiment, the filter device further comprises a filter housing 30 having an air exit 39 and a carbon filter compartment 36 for receiving active carbon therein to filter the air which is to be discharged from the filtering tank 10 so as to further purify the air before it is discharged to the atmosphere via the air exit 39, wherein the filtering tank 10 is supported in the filter housing 30 to communicate the carbon filter compartment 36 with the air outlet 14 of the filtering tank 10.

In addition, the filter device further comprises a guiding duct 33 extended to the air inlet 13 of the filtering tank 10 for guiding the air to flow into the filtering tank 10.

According to the preferred embodiment of the present invention, the filter housing 30 defines a suction cavity 31 and a filter cavity 32 positioned side-by-side, wherein the guiding duct 33 communicates between the suction cavity 31 and the filter cavity 32 in such a manner that air in the suction cavity 31 is capable of passing through the filter cavity 32 via the guiding duct 33. Moreover, the filter cavity 32 defines the carbon filter compartment 36 therein for containing the active carbon.

Referring to FIG. 1 drawings, the filter housing 30 further has an air passageway 38 communicatively extended from the air outlet 14 of the filtering tank 10 to the carbon filter compartment 36, wherein the air passageway 38 has a zigzag shape for preventing the filtering solution 112 to enter into the carbon filter compartment 36 when the air flows thereto.

Specifically, the filter housing 30 further comprises a filter divider 34 extended within the filter cavity 32 to divide the filter cavity 32 into a solution filter compartment 35 filled with a predetermined volume of solution and communicated with the filter chamber 11 of the filtering tank 10, and the carbon filter compartment 36 adjacent to the solution filter compartment 35.

As shown in FIG. 1 of the drawings, the filtering tank 10 is supported within the solution filter compartment 35 at the filter cavity 32 wherein the filtering solution 12 is allowed to flow between the filter chamber 11 and the solution filter compartment 35 via the air outlet 14 for doing through the air passageway 38.

Accordingly, the air inlet 13 is communicated with the guiding duct 33 such that air within the suction cavity 31 is arranged to pass through the guiding duct 33 to reach the filter chamber 11 via the air inlet 13 for being subsequently guided to mix with the filtering solution 12 by the mixing rotor 20 and discharged through the air outlet 14 to reach the carbon filter compartment 36.

Preferably, the filter device further comprises a carbon filter 50 comprising a plurality of carbon filter layers 51 each containing a predetermined amount of active carbon spacedly disposed within the carbon filter compartment 36 for further filtering the air going out from the filtering tank 10 before such air is emitted into the atmosphere.

According to the preferred embodiment of the present invention, the filter divider 34 and the filtering tank 10 are supported within the filter cavity 32 of the filter housing 30, and are spacedly apart from each other to define the air passageway 38 between the filtering divider 34 and the filtering tank 10 wherein purified air from the filtering tank 10 is arranged for diffusing out of the filtering solution 12 to reach the carbon filter compartment 36 via the air passageway 38.

As a result, the air exit 39 communicates the carbon filter compartment 36 with an exterior of the filter housing 30 wherein the air filtered by the carbon filter 50 is guided to discharge to atmosphere via the air exit 39.

Referring to FIG. 1 of the drawings, the filter device further comprises a suction device 40 supported within the suction cavity 31 for drawing polluted or exhausted air to the filter cavity for purifying through the guiding duct 33. Specifically, the suction device 40 comprises at least one, but preferably two, fan assemblies 41 mounted in the suction cavity 31 in such a manner that the two fan assemblies 41 are spacedly apart from each other within the suction cavity 31 to communicate with the guiding duct 33. Each of the fan assemblies 41 comprises a centrifugal fan 411 and an axial fan 412 mounted underneath the centrifugal fan 411 wherein exhausted air is first axially draw from right under the axial fan 412 to reach the respective centrifugal fan 411 which subsequently guides the air to flow sidewardly with respect to the centrifugal fan 411 to be collected within the guiding duct 33.

The axial fan 412 of each of the fan assemblies 41 comprises an axial fan hub mounted underneath the respective centrifugal fan 411 to substantially align with it, and a plurality of axial fan blades radially extended from the axial fan hub at a predetermined blade angle for drawing air to pass through the axial fan 412 axially to reach the centrifugal fan 411. It is worth mentioning that in order to maximize the effectiveness and the efficiency of drawing of air, the centrifugal fan 411 and the axial fan 412 are electrically connected to a single electric power source, and that a radial diameter of the axial fan 412 is greater than a radial diameter of the centrifugal fan 411. Hence, for the same power inputted to the fan assembly 41, the flow rate and the suction area for drawing air can be maximized.

Referring to FIG. 2 to FIG. 3 of the drawings, each of the air paddles 22, having a zigzag cross section, has at least a solution cavity 221 formed thereon and is arranged in such a manner that when each of the air paddles 22 is rotated at the solution portion 112 of the filter chamber 11, each of the air paddles 22 is adapted for containing a portion of the filtering solution 12 within the solution cavity 221 for mixing the filtering solution 112 with the air.

Moreover, each of the air paddles 22 further has an outer end portion 23, having a T-shape or L-shaped structure, extended to have a surface curvature substantially the same as a surface curvature of that of an inner surface of the filtering tank 10, wherein a radial diameter of the mixing rotor 20 is slightly smaller than a radial diameter of the filtering tank 10 so that when the mixing rotor 20 is rotating, the filtering solution is guided and driven to fill in a gap between the outer end portion 23 of the air paddle 22 and the inner sidewall of the filtering tank 10 for preventing air leakage via that gap.

Moreover, as shown in FIG. 1 of the drawings, the guiding duct 33 of the filter housing 30 is shaped and crafted to gradually decrease in diameter from the suction cavity 31 to the filter cavity 32 at the air inlet 13 of the filtering tank 10. In other words, by simple fluid mechanics, the guiding duct 33 has a gradually contracting diameter wherein polluted air flowing through the guiding duct 33 is increasing in flow rate so as to effectively drive the air paddle 22 rotating to mix the polluted air with the filtering solution 12 in the above-mentioned fashion. In other words, an outlet diameter of the guiding duct 33 is substantially smaller than an inlet diameter of the guiding duct 33 such that the guiding duct 33 is adapted for increasing a flow rate of the air flowing into the filtering tank 10 towards the air paddles 22 so as to propel the mixing rotor to rotate.

It is also worth mentioning that, as an alternative, the mixing rotor 20 may be powered by a motor 70 in order to ensure uniform rotation of the air paddle 22 for uniform performance of the filter device of the present invention. Thus, the filter device further comprises a motor 70 supported by the filter housing 30 and connected with the rotor hub 21 of the mixing rotor 20 so as to drive the mixing rotor 20 to rotate for mixing the air with the filtering solution 12, as schematically shown in FIG. 2 of the drawings.

In order to provide adequate driving force of the mixing rotor 20, the air paddle 22 further has a driven portion which is in communication with the air inlet 13 of the filtering tank 10 in such a manner that the polluted air coming from the air inlet 13 is adapted to drive the respective air paddle 22 rotating about the rotor hub 21 so as to mix the polluted air with the filtering solution 12 in the above-mentioned fashion. Specifically, the driven portion of the air paddle 21 has a L-shaped outer surface thereof for forming a plurality of solution cavities 221 thereon in a zigzag manner so as to maximize a contact surface area between the polluted air and the air paddle 22 such that the mixing rotor 20 can be maximally driven by the incoming polluted air coming from the air inlet 13.

Moreover, referring to FIG. 1 of the drawings, the guiding duct 33 has a blocking member 331 provided at a position close to the air inlet 13 of the filtering tank 20 for preventing the filtering solution 12 from entering into the guiding duct 33 when the mixing rotor 22 is driven to rotate.

According to the preferred embodiment of the present invention, the filtering solution 12 is embodied as water which, when mixed with polluted air, is capable of cooling down the polluted air or moisture and adhering such pollutants as oil particles as well as carbon particulates on the water surface within the filter cavity 32 of the filter housing 30.

As a result, the filtering tank 10 further has a solution inlet 15 for guiding the filtering solution 12 to flow into the filter chamber 11, wherein the air outlet 14 is formed at the solution portion 112 of the filtering tank for simultaneously discharging the filtering solution 12 and the air mixing therewith. Thus, the filtering tank 10 further has a solution outlet 16 formed thereon, wherein the solution inlet 15 communicates the filter chamber 11 with an external solution source, such as an external water source, while the solution outlet 16 communicates the filter chamber 11 with a discharge outlet 37 provided on the filter housing 30.

According to the preferred embodiment of the present invention, the filtering solution is required to be changed or refreshed after a predetermined period of time, such that the pollutant trapped or adhered on the filtering solution is dismantled from the filter device and the filtering solution is refreshed to filter incoming polluted air.

The operation of the present invention is as follows: the filter device is first positioned to a fixture from which polluted air comes out, whereupon the suction device 40 is adapted to withdraw the polluted air to the filtering tank 10 via the gradually contracting guiding duct 33. The flow rate of the polluted air is increased by the guiding duct 33. The mixing rotor 20 is then driven to rotate to strike on the filtering solution 12 wherein the polluted air is mixed with it. Then, the polluted is adhered onto the filtering solution 12 and the air forms as a plurality of tiny bubbles which are then forced, due to rotation of the air paddle 22, to the air outlet 14 of the filtering tank 10. The tiny bubbles are then float onto the filtering solution's surface at the air passageway 38 for entering into the carbon filter compartment. The air is then further filtered by the carbon filter 50 and then eventually discharged through the air exit 39.

It is worth mentioning that the filter device of the present invention is adapted to be utilized in domestic environment as air purifier, to filter, for example, containments from domestic cooking, or for industrial use for being installed in a motor vehicle, such that polluted air resulting from combustion can be effectively filtered.

In order to retain the filtering solution 12 within the filtering tank 10 while the fixture on which the filter device is resided is vibrating, the filter divider 34 has at least one leak barrier 341 integrally and transversely extended from the filter divider 34 to partially cover the air passageway 38 so as form the zigzag cross section of the thereof for blocking any filtering solution 12 from leaking through the air passageway 38, possibly into the carbon filter compartment 36. Moreover, the filter divider 34 can also be embodied as curved in cross section towards the filtering tank 10 so as to assist in preventing leakage of filtering solution 12 via the air passageway 38.

Figure 4:
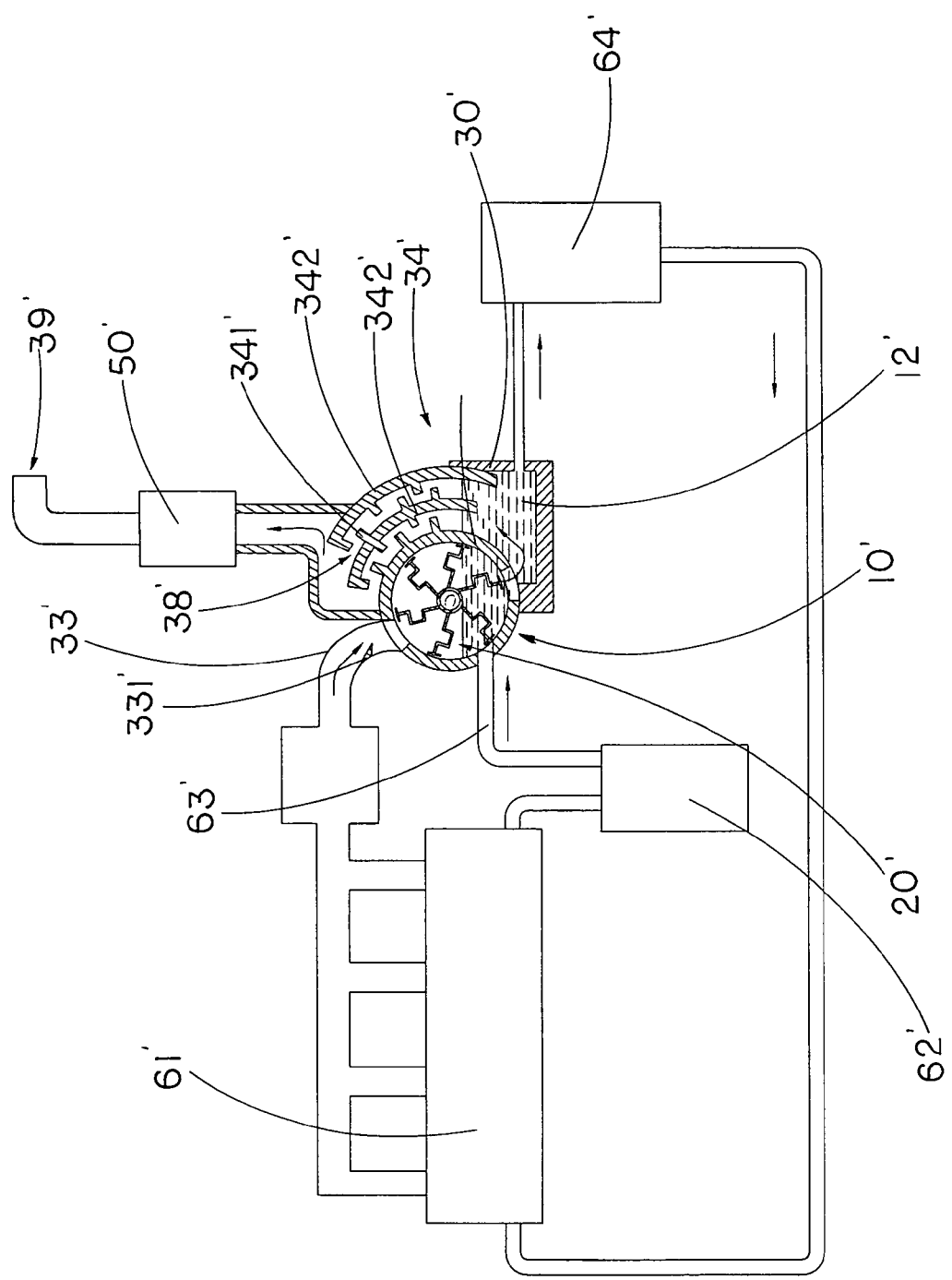
FIG. 4 is a first alternative mode of the filter device according to the above preferred embodiment of the present invention, illustrating that the filter device is for use in a motor vehicle comprising a combustion engine.

Referring to FIG. 4 of the drawings, a schematic diagram of the filter device according to an alternative mode of the present invention is illustrated, in which the filter device is adapted for use in a motor vehicle comprising a combustion engine 61', a cooling device 62', and a coolant pipe 63' connecting with the cooling device 62'. The alternative mode is similar to the first alternative mode except the filter divider 34'. Moreover, the above-mentioned suction device 40 is not utilized.

According to the alternative mode, the guiding duct 33' of the filter housing 30' is connected with the combusting engine 61' of the motor vehicle, whereas the solution inlet 15 of the filtering tank 10' is connected with the coolant pipe 63' of the motor vehicle. Referring to FIG. 4 of the drawings, the motor vehicle further comprises a coolant filter 64' wherein the cooling device 62' is connecting between the combustion engine 61' and the filtering tank 10', and that the coolant filter 64' is connecting between the filtering tank 10' and the combustion engine 61'. Thus, the coolant is flowing from the cooling device 62' to the filtering tank 10' to act as the filtering solution 12' which is then mix with the polluted air driven by the mixing rotor 20'. After that, the coolant is directed to the coolant filter 64' for dismantling the pollutants filtered by the coolant, and then driven to the combustion engine 61' for cooling thereof during combustion process by the motor vehicle.

It is also important to point out that the filter divider 34' is, according to the alternative mode of the present invention, embodied as a two divider pieces 342' upwardly extended at the air passageway 38', wherein a plurality of the leak barriers 341' are transversely extended to partially cover the air passageway 38' for forming the zigzag structure. In other words, the air passageway 38' is shielded with the leak barriers 341' so that the filtering solution 12' is prevented from leaking out of the solution filter compartment 35' to the carbon filter compartment 36'.

As a second alternative, the filtering solution 12 may also be embodied as sanitizing agent, so that the filter device of the present invention can also be utilized in hospital environment in which the air can be effectively sanitized when mixing with the filtering solution 12, especially filtering such diseases as lung infection diseases or even Severe Acute Respiratory Syndrome (SARS).

Figure 5:
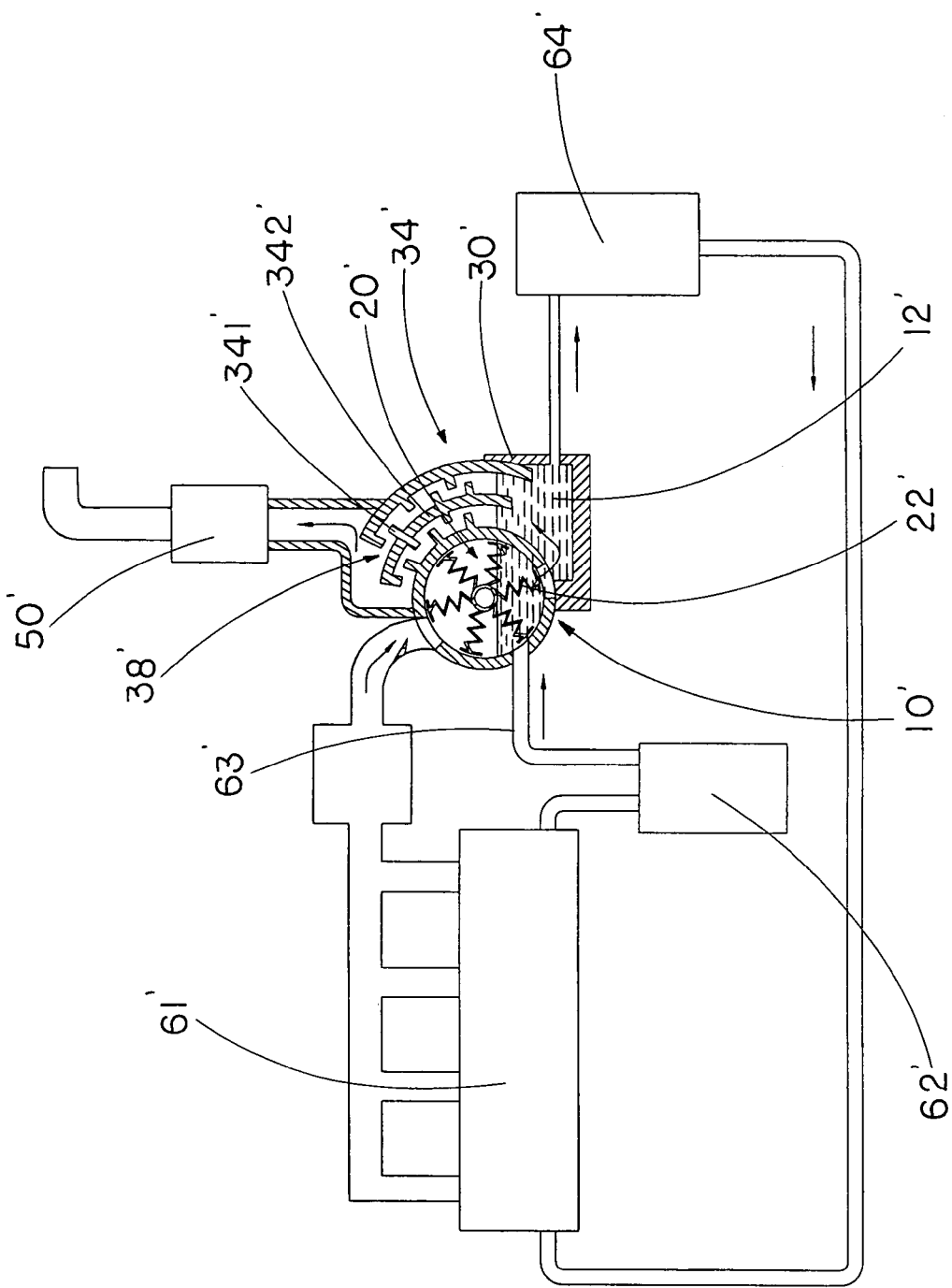
FIG. 5 is a second alternative mode of the filter device according to the above preferred embodiment of the present invention, illustrating that the driven portion of the air paddle defines a zigzag outer surface.
Figure 6:
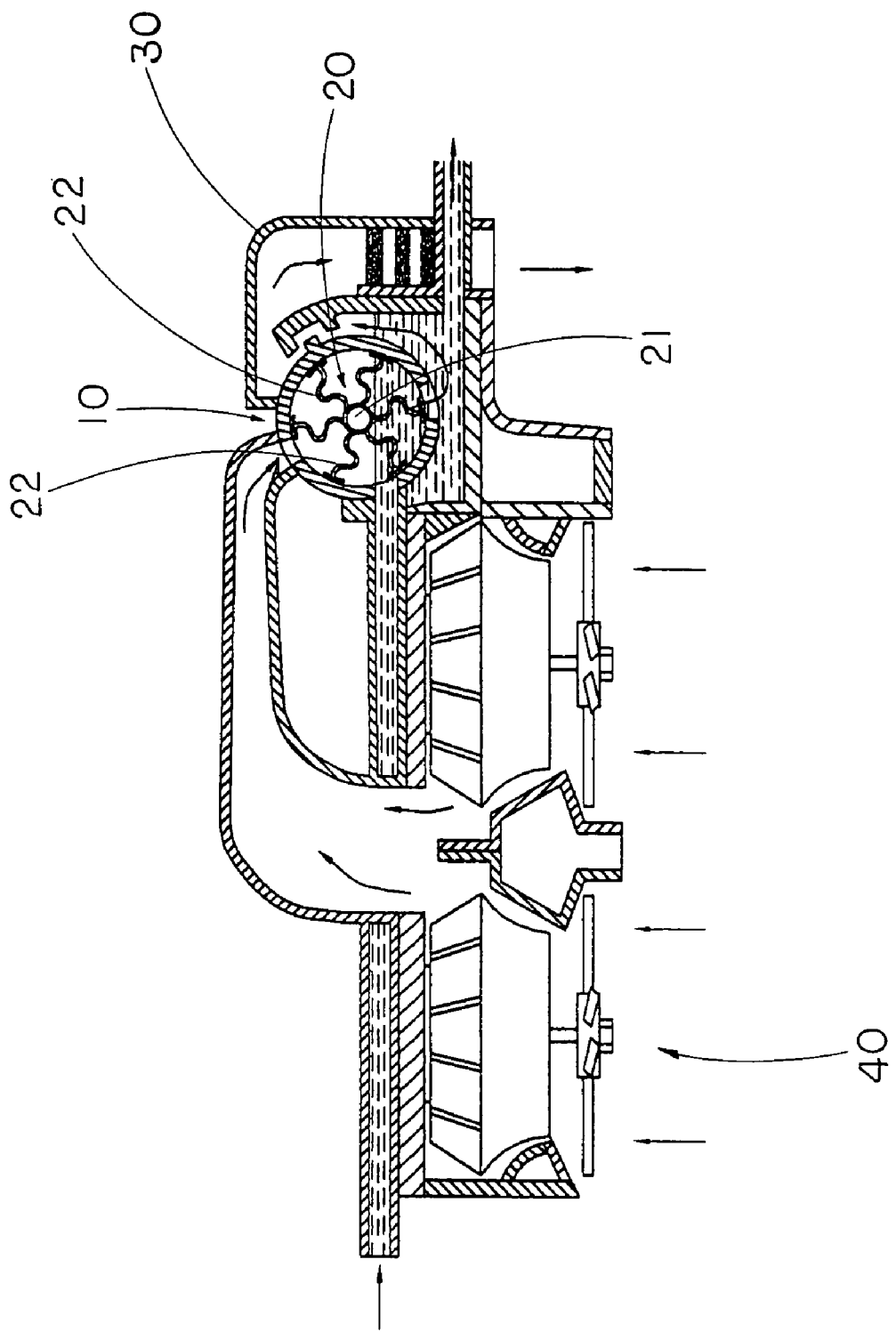
FIG. 6 is a third alternative mode of the filter device according to the above preferred embodiment of the present invention, illustrating that the driven portion of the air paddle defines a wavy in outer surface.

As two alternatives of the driven portion of the air paddle 22 (22'), such as that shown in FIG. 5 and FIG. 6 of the drawings, the driven portion defines, respectively a zigzag cross section and a wavy cross section for contacting with the incoming polluted air from the air inlet 13. In both cases, the surface area for contacting the incoming polluted air is significantly increased. It is worth mentioning that the filter device as shown in FIG. 5 and FIG. 6 are similar to that of the first preferred embodiment (FIG. 1) and the alternative mode (FIG. 4) respectively except the cross section of the air paddles 22.

From the forgoing descriptions, it can be shown that the above-mentioned objects are substantially accomplished. The present invention successfully provides a filter device which is adapted to block pollutant from exhaust air mainly come from a combustion engine of a transportation vehicle, such as a motor vehicle, or a ship. However, the scope of applications of the present invention can be extended to domestic environment as well as hospital environment such that air in the relevant circumstances can be effective filtered and/or sanitized. It can also be utilized in industrial environments to filter air within a metallurgical plant, an electroplating plant, a chemical process plant, or an electric plant.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A filter device for purifying air, comprising:

a filtering tank having a filter chamber for containing a predetermined volume of filtering solution to filter particles of said air and defining an upper air portion and a lower solution portion, an air inlet formed at said air portion for guiding said air to flow into said filter chamber and an air outlet for said air to exit from said filter chamber after said air passes through said filtering solution;

a mixing rotor rotatably supported in said filtering tank, wherein said mixing rotor comprises a rotor hub driven to be rotated within said filter chamber and a plurality of air paddles spacedly and radially extended from said rotor hub for striking towards said filtering solution at said solution portion of said filter chamber for drawing said air to mix with said filtering solution, wherein said filtering solution is adapted to filter said air when said air is mixed with said filtering solution, wherein each of said air paddles, which has a zigzag cross section, has at least a solution cavity formed thereon and is arranged in such a manner that when each of said air paddles is rotated at said solution portion of said filtering tank, each of said air paddles is adapted for containing a portion of said filtering solution within said solution cavity for mixing said filtering solution with said air, wherein each of said air paddles has an outer end portion transversely extended therefrom to have a surface curvature substantially the same as a surface curvature of an inner surface of said filtering tank, wherein a radial diameter of said mixing rotor is slightly smaller than a radial diameter of said filtering tank so that when said mixing rotor is rotating, said filtering solution is guided and driven to fill in a gap between said outer end portion of said air paddle and said inner sidewall of said filtering tank for preventing air leakage via said gap;

a filter housing, which has an air exit, a carbon filter compartment for receiving active carbon therein to filter said air discharged from said filtering tank so as to further purify said air before discharging at said air exit, and an air passageway communicatively extended from said air outlet of said filtering tank to said carbon filter compartment, wherein said air passageway has a zigzag shape for preventing said filtering solution entering into said carbon filter compartment when said air flows thereto, wherein said filtering tank is supported in said filter housing to communicate said carbon filter compartment with said air outlet of said filtering tank; and a guiding duct extended to said air inlet of said filtering tank for guiding said air to flow into said filtering tank, wherein an outlet diameter of said guiding duct is substantially smaller than an inlet diameter of said guiding duct such that said guiding duct is adapted for increasing a flow rate of said air flowing into said filtering tank towards said air paddles so as to propel said mixing rotor to rotate.

2. The filter device, as recited in claim 1, wherein said filtering tank further has a solution inlet for guiding said filtering solution to flow into said filter chamber, wherein said air outlet is formed at said solution portion of said filtering tank for simultaneously discharging said filtering solution and said air mixing therewith.

3. The filter device, as recited in claim 1, wherein said guiding duct has a blocking member provided at a position close to said air inlet of said filtering tank for prevent said filtering solution from entering into said guiding duct when said mixing rotor is driven to rotate.

4. The filter device, as recited in claim 2, wherein said guiding duct has a blocking member provided at a position close to said air inlet of said filtering tank for prevent said filtering solution from entering into said guiding duct when said mixing rotor is driven to rotate.

5. The filter device, as recited in claim 3, further comprising a suction device which comprises at least a fan assembly operatively communicate with said guiding duct for drawing said air into said filtering tank through said guiding duct.

6. The filter device, as recited in claim 4, further comprising a suction device which comprises at least a fan assembly operatively communicate with said guiding duct for drawing said air into said filtering tank through said guiding duct.

7. The filter device, as recited in claim 5, wherein said filtering solution is water.

8. The filter device, as recited in claim 6, wherein said filtering solution is water.

9. The filter device, as recited in claim 7, further comprising a motor supported by said filter housing and connected with said rotor hub of said mixing rotor so as to drive said mixing rotor to rotate for mixing said air with said filtering solution.

10. The filter device, as recited in claim 8, further comprising a motor supported by said filter housing and connected with said rotor hub of said mixing rotor so as to drive said mixing rotor to rotate for mixing said air with said filtering solution.

11. The filter device, as recited in claim 10, wherein said outer end portion of each of said air paddles has a T-shaped cross section extended therefrom to form said gap between said respective air paddle and said inner sidewall of said filtering tank.

12. The filter device, as recited in claim 10, wherein said outer end portion of each of said air paddles has a L-shaped cross section extended therefrom to form said gap between said respective air paddle and said inner sidewall of said filtering tank.

13. The filter device, as recited in claim 5, wherein said filtering solution is sanitizing agent for combating microorganisms and bacteria.

14. The filter device, as recited in claim 6, wherein said filtering solution is sanitizing agent for combating microorganisms and bacteria.

15. The filter device, as recited in claim 13, further comprising a motor supported by said filter housing and connected with said rotor hub of said mixing rotor so as to drive said mixing rotor to rotate for mixing said air with said filtering solution.

16. The filter device, as recited in claim 14, further comprising a motor supported by said filter housing and connected with said rotor hub of said mixing rotor so as to drive said mixing rotor to rotate for mixing said air with said filtering solution.

17. The filter device, as recited in claim 16, wherein said outer end portion of each of said air paddles has a T-shaped cross section extended therefrom to form said gap between said respective air paddle and said inner sidewall of said filtering tank.

18. The filter device, as recited in claim 16, wherein said outer end portion of each of said air paddles has a L-shaped cross section extended therefrom to form said gap between said respective air paddle and said inner sidewall of said filtering tank.

* * * * *